(12) United States Patent
Algreatly

(10) Patent No.: US 9,035,877 B2
(45) Date of Patent: May 19, 2015

(54) 3D COMPUTER CURSOR

(75) Inventor: Cherif Atia Algreatly, Palo Alto, CA (US)

(73) Assignee: Cherif Atia Algreatly, Fremont, CA (US)

( * ) Notice: Subject to any disclaimer, the term of this patent is extended or adjusted under 35 U.S.C. 154(b) by 440 days.

(21) Appl. No.: 13/200,209

(22) Filed: Sep. 20, 2011

(65) Prior Publication Data

US 2012/0075181 A1    Mar. 29, 2012

Related U.S. Application Data

(63) Continuation-in-part of application No. PCT/EG2009/000012, filed on Mar. 22, 2009.

(51) Int. Cl.
| | | |
|---|---|---|
| *G06F 3/033* | (2013.01) | |
| *G06F 3/0481* | (2013.01) | |
| *G06F 3/0486* | (2013.01) | |

(52) U.S. Cl.
CPC .......... *G06F 3/04815* (2013.01); *G06F 3/0486* (2013.01)

(58) Field of Classification Search
CPC ... G06F 3/0346; G06F 3/0362; G06F 3/0486; G06F 3/03543; G06F 3/03549; G06F 3/04815
USPC ......... 345/156–180, 419, 440, 619, 634, 681; 715/234, 856, 863; 702/152, 153; 700/94
See application file for complete search history.

(56) References Cited

U.S. PATENT DOCUMENTS

| | | | | |
|---|---|---|---|---|
| 4,835,528 A | * | 5/1989 | Flinchbaugh | 345/159 |
| 4,839,838 A | * | 6/1989 | LaBiche et al. | 708/141 |
| 5,010,500 A | * | 4/1991 | Makkuni et al. | 715/863 |
| 5,227,985 A | * | 7/1993 | DeMenthon | 702/153 |
| 5,297,061 A | * | 3/1994 | Dementhon et al. | 345/180 |
| 5,652,603 A | * | 7/1997 | Abrams | 345/157 |
| 5,760,764 A | * | 6/1998 | Martinelli | 345/160 |
| 5,771,037 A | * | 6/1998 | Jackson | 345/157 |
| 5,798,761 A | * | 8/1998 | Isaacs | 345/419 |
| 5,923,318 A | * | 7/1999 | Zhai et al. | 345/157 |
| 6,023,275 A | * | 2/2000 | Horvitz et al. | 715/700 |
| 6,229,542 B1 | * | 5/2001 | Miller | 715/782 |
| 6,239,785 B1 | * | 5/2001 | Wallace et al. | 345/156 |
| 6,342,878 B1 | * | 1/2002 | Chevassus et al. | 345/158 |
| 6,426,745 B1 | * | 7/2002 | Isaacs et al. | 345/419 |
| 6,448,964 B1 | * | 9/2002 | Isaacs et al. | 345/419 |
| 6,573,903 B2 | * | 6/2003 | Gantt | 345/619 |
| 6,628,279 B1 | * | 9/2003 | Schell et al. | 345/420 |
| 6,795,068 B1 | * | 9/2004 | Marks | 345/419 |
| 6,825,838 B2 | * | 11/2004 | Smith et al. | 345/419 |
| 7,138,997 B2 | * | 11/2006 | Balakrishnan et al. | 345/419 |
| RE40,891 E | * | 9/2009 | Yasutake | 345/173 |
| 8,177,551 B2 | * | 5/2012 | Sachdeva et al. | 433/2 |
| 8,340,726 B1 | * | 12/2012 | Fujisaki | 455/566 |
| 8,368,687 B2 | * | 2/2013 | Iwano | 345/419 |
| 8,471,873 B2 | * | 6/2013 | Kawahara et al. | 345/679 |
| 8,913,056 B2 | * | 12/2014 | Zimmer et al. | 345/419 |
| 2002/0018061 A1 | * | 2/2002 | Gantt | 345/419 |

(Continued)

*Primary Examiner* — Prabodh M Dharia

(57) ABSTRACT

The present invention introduces a 3D computer cursor that helps the user to interact with 3D computer applications in an intuitive manner. Said 3D computer cursor enables the user to easily manipulate a plurality of windows, objects, or the like to be moved or rotated in three dimensions on the computer display serving a variety of desktop and web-based applications.

16 Claims, 18 Drawing Sheets

(56) References Cited

U.S. PATENT DOCUMENTS

| | | | |
|---|---|---|---|
| 2002/0145611 A1* | 10/2002 | Dye et al. | 345/543 |
| 2003/0043170 A1* | 3/2003 | Fleury | 345/619 |
| 2003/0058238 A1* | 3/2003 | Doak et al. | 345/419 |
| 2003/0222977 A1* | 12/2003 | Yoshino | 348/51 |
| 2004/0001075 A1* | 1/2004 | Balakrishnan et al. | 345/653 |
| 2004/0070582 A1* | 4/2004 | Smith et al. | 345/419 |
| 2005/0128211 A1* | 6/2005 | Berger et al. | 345/582 |
| 2007/0206027 A1* | 9/2007 | Chen | 345/620 |
| 2008/0010616 A1* | 1/2008 | Algreatly | 715/856 |
| 2008/0028725 A1* | 2/2008 | Algreatly | 52/750 |
| 2008/0062126 A1* | 3/2008 | Algreatly | 345/157 |
| 2008/0149832 A1* | 6/2008 | Zorn | 250/311 |
| 2008/0232658 A1* | 9/2008 | Sugaya et al. | 382/128 |
| 2008/0319561 A1* | 12/2008 | Lim et al. | 700/94 |
| 2009/0125801 A1* | 5/2009 | Algreatly | 715/234 |
| 2010/0034485 A1* | 2/2010 | Algreatly | 382/307 |
| 2010/0149316 A1* | 6/2010 | VanBree et al. | 348/46 |
| 2011/0244919 A1* | 10/2011 | Aller et al. | 455/556.1 |
| 2012/0075295 A1* | 3/2012 | Aoki et al. | 345/419 |
| 2012/0165046 A1* | 6/2012 | Rhoads et al. | 455/456.3 |

\* cited by examiner

FIG. 32.1
FIG. 32.2
FIG. 32.3
FIG. 32.4
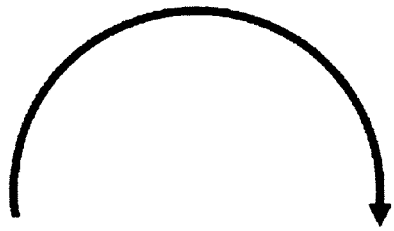
FIG. 32.5
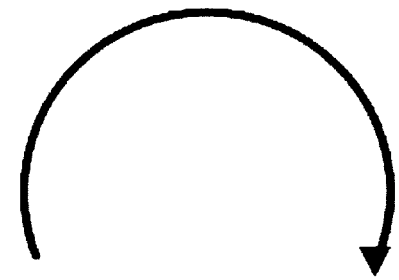
FIG. 32.6
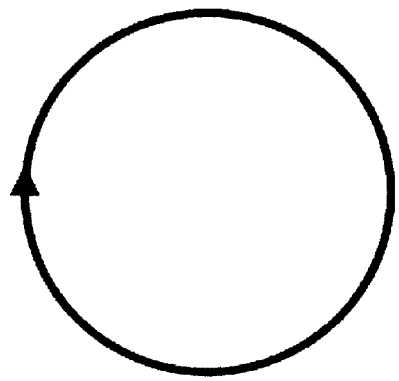
FIG. 32.7

3D COMPUTER CURSOR

This application is a Continuation-in-Part of co-pending International Patent Application No. PCT/EG2009/000012, filed Mar. 22, 2009.

BACKGROUND

The computer cursor is manipulated by the mouse to move on the computer display in 2D and/or 3D using the Cartesian coordinate system. In the last few years, new versions of Windows systems, Web-based applications, and desktop software have dramatically changed to integrate the use of 2D and 3D together. Microsoft Windows 8, Internet world mapping such as Google Earth, and CAD/CAM/CAE software are examples of such applications, where the traditional computer cursor and input method which utilize the Cartesian coordinate system are no longer suitable for such new applications as they used to be before.

For example, the traditional computer cursor has no accurate, logical control of the exact angle or distance of movement in 2D; it is always moved in multiple, discrete steps until it reaches its target on the computer display, and with 3D applications, the user loses the sense of orientation and can only see a deceiving projection of the cursor's position on the 3D virtual environment. The traditional computer input method utilizes the Cartesian coordinate system to move the cursor on the computer display, and also to provide positional information by the mouse's movement to the computer system, where this input method has many disadvantages when used with the 3D applications. For example, it is hard to accurately move an object on the computer display in 3D if the movement is not parallel to the x, y, and z-axis, and it is difficult to navigate on the computer display to a point that is not defined with x, y, and z coordinates.

SUMMARY

The present invention introduces a solution that eliminates the counter-intuitiveness and, in some cases, the complete failure of the traditional computer and input method in dealing with the 3D Windows system and 3D Internet and software applications. It introduces an innovative 3D computer cursor and input method that together provide the computer user with a complete integrated tool to operate the 3D applications effectively and efficiently, saving both the user's time and effort. For example, the present 3D cursor gives the user the ability to control the movement angles and distance of the objects on the computer display to be in lines, curves, or circles. This gives the user a perfect sense of orientation in 2D and 3D and helps achieve tasks that needed complicated software, consequently, reducing the user's time and effort in targeting or moving objects in 3D on the computer display.

Generally, the present 3D utilizes the spherical coordinate system instead of the Cartesian coordinate system, giving the user full control to move, navigate, or edit in 3D. Accordingly, the 3D virtual environment on the computer display becomes accessible to the user and void of having screen projection illusions as in current cases when using the Cartesian coordinate system. However, it is important to note that the manipulation of the present 3D cursor does not require a special computer input device such as a 3D computer mouse, where the traditional computer mouse, computer keyboard, touchpad, or touch-screen easily enables the user to interact with the present invention.

BRIEF DESCRIPTION OF THE DRAWINGS

FIG. 1 illustrates an object presented on the computer display representing an icon, image, window or the like.

FIGS. 32.1 to 32.7 illustrate changing the 3D cursor from the linear form to the curvature form.

DETAILED DESCRIPTION

Figure 1:
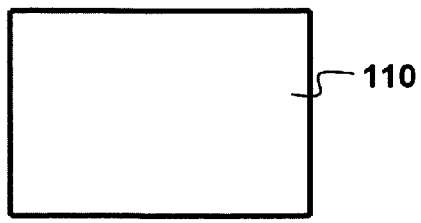
Figure 2:
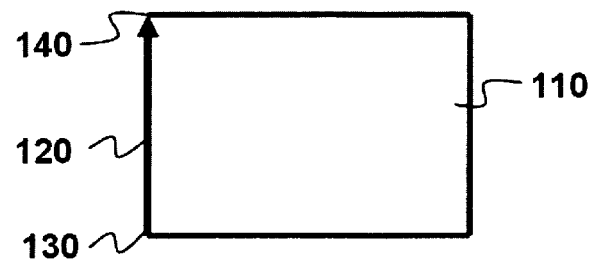
FIGS. 2 to 8 illustrate manipulating the 3D cursor to change the direction and dimensions of an object on the computer display.

FIG. 1 illustrates an object 110 presented on the computer display representing an icon, image, window or the like. In one embodiment of the present invention, FIG. 2 illustrates creating a 3D cursor 120 on the computer display by selecting a first end 130 and a second end 140 for this 3D cursor. The first end and the second end are located on two corners of the object as shown in the figure. The first end represents the base of the 3D cursor, and the second end represents the head of the 3D cursor. The 3D cursor can be rotated vertically or horizontally to respectively rotate the object vertically or horizontally. Also the 3D cursor can be protracted or retracted to respectively protract or retract the object on the computer display.

Figure 3:
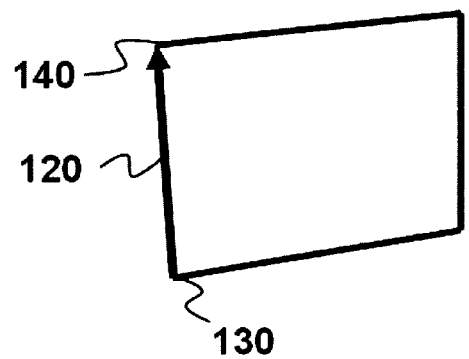
Figure 4:
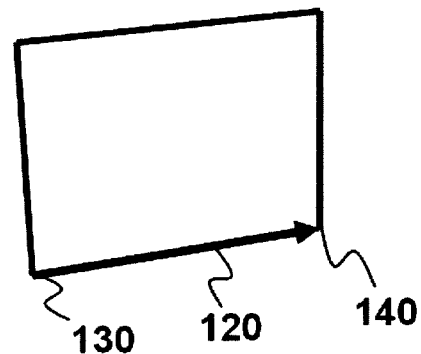
Figure 5:
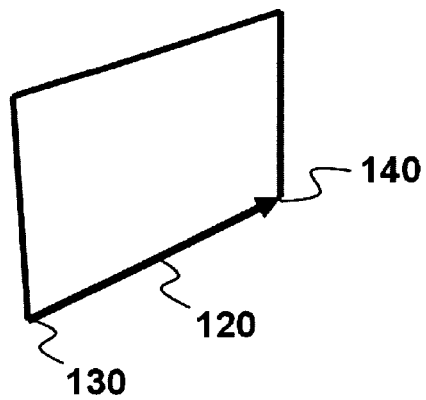
Figure 6:
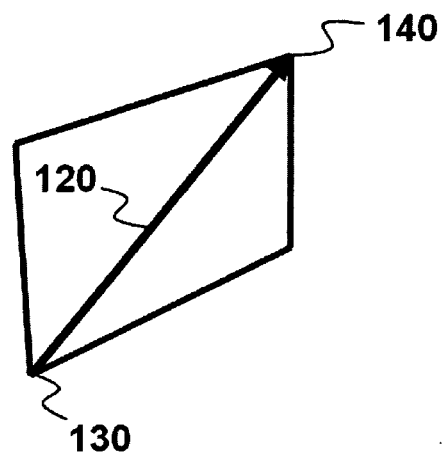
Figure 7:
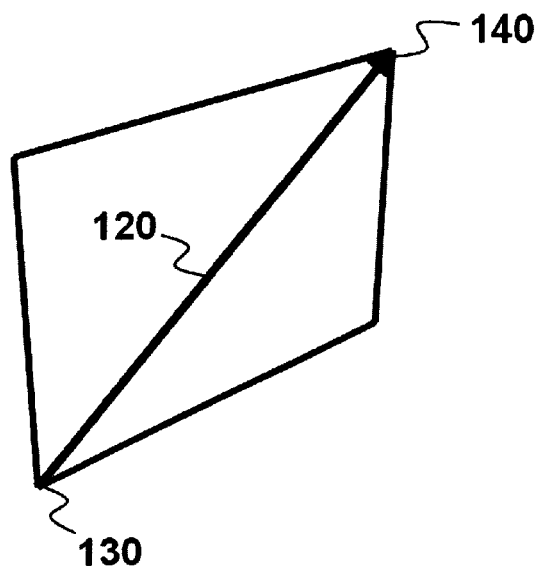
Figure 8:
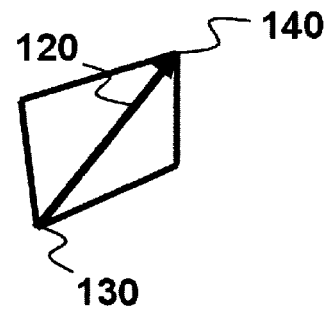

For example, FIG. 3 illustrates rotating the 3D cursor vertically to simultaneously rotate the object vertically on the computer display. FIG. 4 illustrates positioning the first and second ends of the 3D cursor on other two corners of the object after rotating it vertically. FIG. 5 illustrates rotating the 3D cursor horizontally to simultaneously rotate the object horizontally on the computer display. FIG. 6 illustrates positioning the first and second ends of the 3D cursor on other two corners of the object, where protracting the 3D cursor increases the dimensions of the object as illustrated in FIG. 7 while retracting the 3D cursor decreases the dimensions of the object as illustrated in FIG. 8.

Generally when rotating, protracting, or retracting the 3D cursor its first end or base does not move while its second end or head moves according to the direction of rotation and the distance of the protraction or the retraction relative to the first end. However, the traditional computer input devices enable the user to simply rotate the 3D cursor horizontally or vertically, or to protract it or retract it on the computer display. For example, in one embodiment of the present invention, when using the computer keyboard, pressing the "Right" arrow button or the "Left" arrow button, respectively, rotates the 3D cursor horizontally, clockwise or counter-clockwise. Pressing the "Up" arrow button or the "Down" arrow button, respectively, rotates the 3D cursor vertically, clockwise or counter-clockwise. Simultaneously pressing the "Shift" button and the "Right" arrow button protracts the 3D cursor, and simultaneously pressing the "Shift" button and the "Left" arrow button retracts the 3D cursor on the computer display.

In another embodiment of the present invention, when using the computer mouse, moving the mouse to the "right", "left" "up", or "down" while pressing on the "left mouse button", respectively, rotates the 3D cursor horizontally, clockwise or counter clockwise, or vertically, clockwise or counter-clockwise. Also moving the mouse to the "right" or "left" while pressing down on the "right mouse button", respectively, protracts or retracts the 3D cursor. When using the touchpad, moving the finger on the touchpad surface to the "right", "left" "up", or "down" while pressing down on the "left touchpad button", respectively, rotates the 3D cursor horizontally, clockwise or counter clockwise, or vertically, clockwise or counter-clockwise. Also moving the finger to the "right" or "left" on the touchpad surface while pressing down on the "right touchpad button", respectively, protracts or retracts the 3D cursor.

Figure 9:
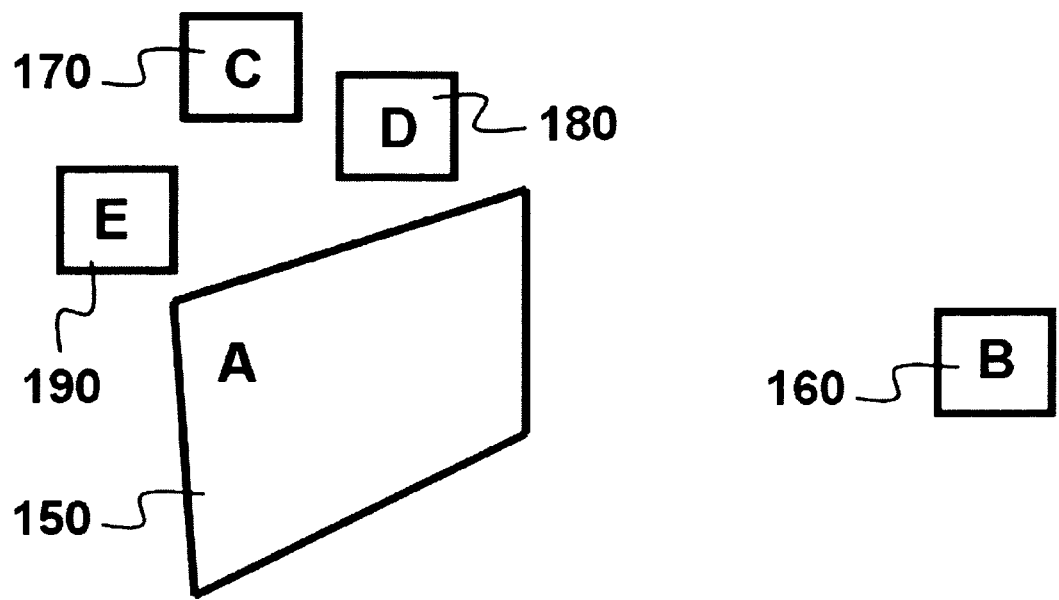
FIGS. 9 to 17 illustrate aligning a plurality of windows to each other in 3D on the computer display using the 3D cursor.
Figure 10:
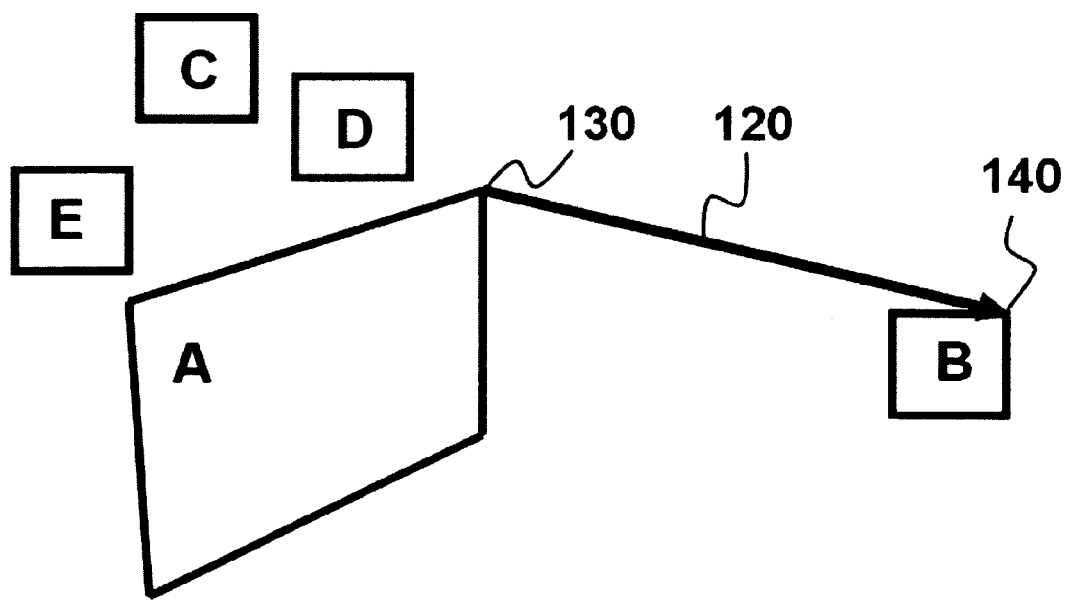
Figure 11:
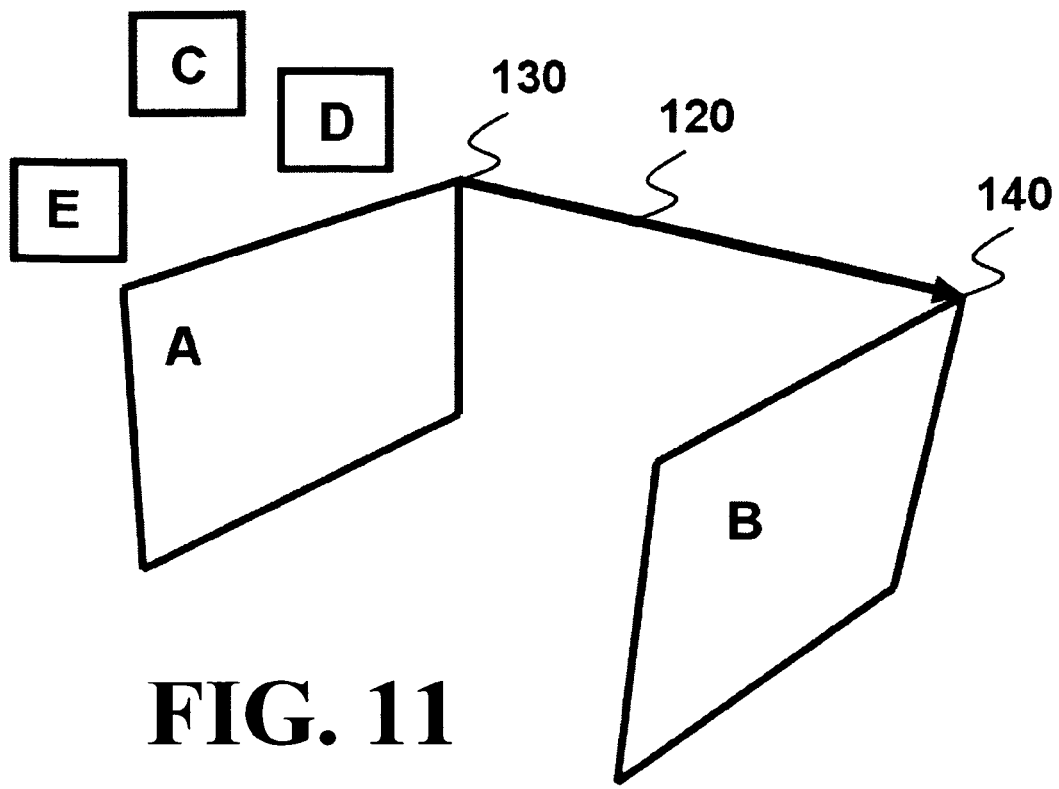

In one embodiment of the present invention, rotating the 3D cursor horizontally or vertically, and protract it or retract it require providing the computer system with six different inputs which can be provided by a variety of computer input devices such as the mouse, the computer keyboard, the touchpad, the pointing stick, the touch-screen, or a 3D computer input device. FIG. 9 illustrates a first object 150 rotated by the 3D cursor to be positioned in 3D on the computer display, and a second object 160, a third object 170, a fourth object 180, and a fifth object 190 that are positioned in 2D on the computer display. The first, second; third, fourth, and fifth objects are, respectively, symbolized with English letters A, B, C, D, and E. FIG. 10 illustrates a 3D cursor 130 created on the computer display by selecting a corner of object A to locate the first end 130 of the 3D cursor, and selecting a corner of object B to locate the second end 140 of the 3D cursor. As illustrated in FIG. 11, once the user selects the second end of the 3D cursor object B is automatically rotated vertically and/or horizontally to be aligned to object A, in addition to, the dimensions or shape of object B is changed to be similar to the dimensions or shape of object A.

Figure 12:
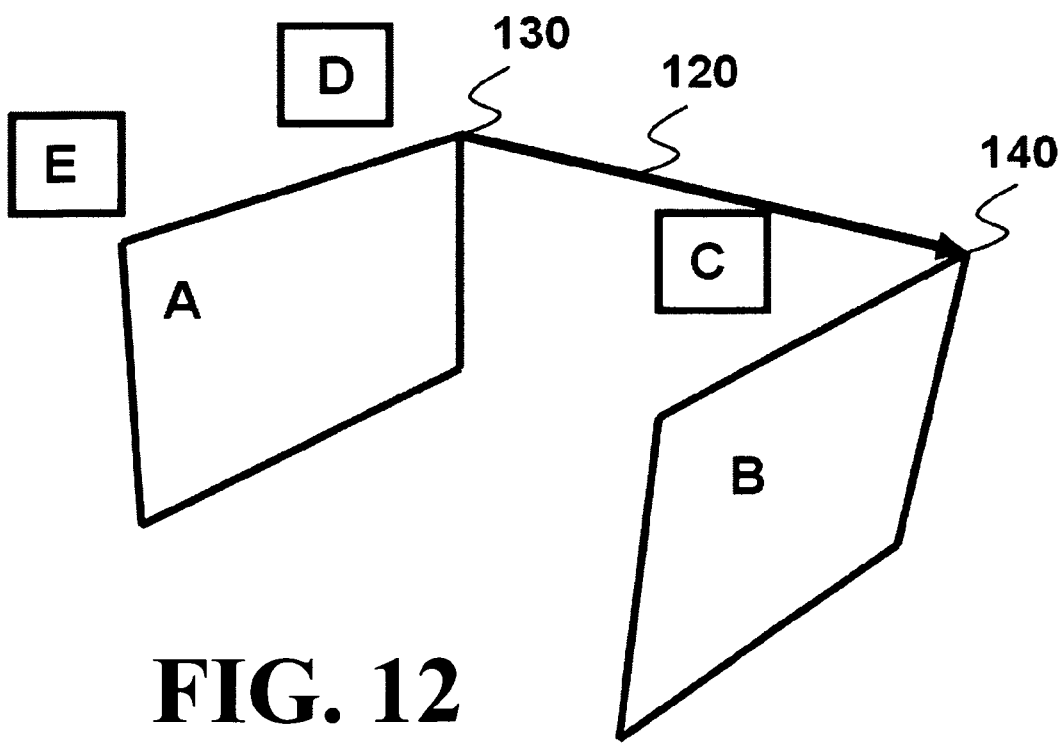
Figure 13:
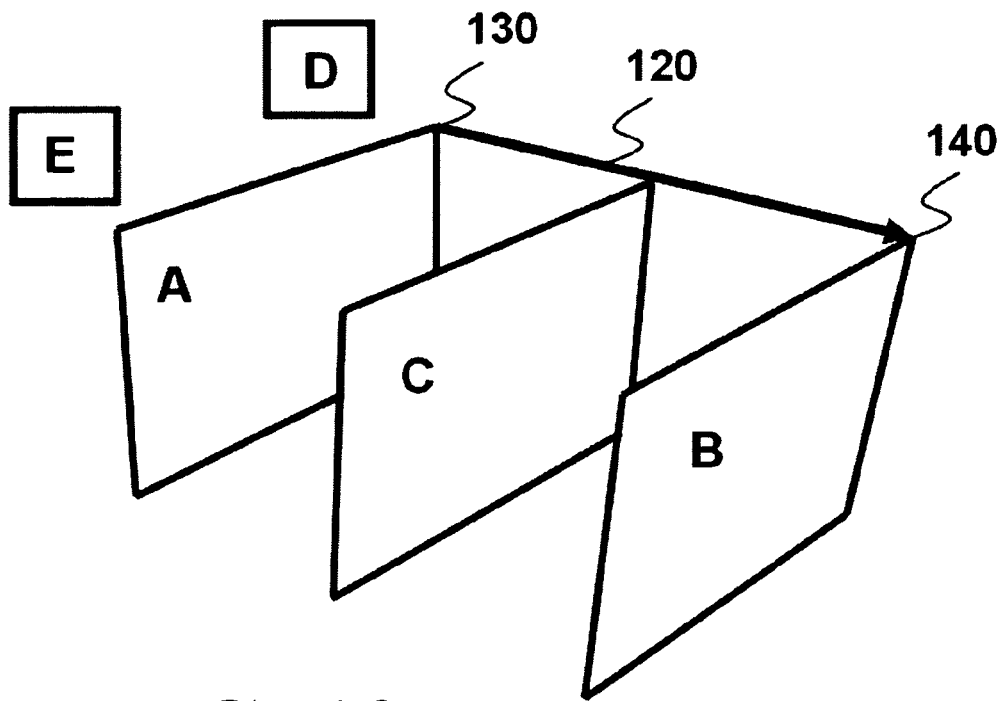

In another embodiment of the present invention, locating the first end of the 3D cursor on a first object then locating the second end of the 3D cursor on a second object rotates the second object to be aligned with the first object in 3D. In addition to, the dimensions or shape of the second object is changed to be similar to the dimensions or shape of the first object on the computer display. FIG. 12 illustrates dragging object C to be located on the 3D cursor between object A and object B. Once the user does so, then object C is rotated in 3D to be aligned to object A and object B as illustrated in FIG. 13. As shown in the figure, objects A, C, and B are automatically positioned on the 3D cursor to be successively equally apart from each other.

Figure 14:
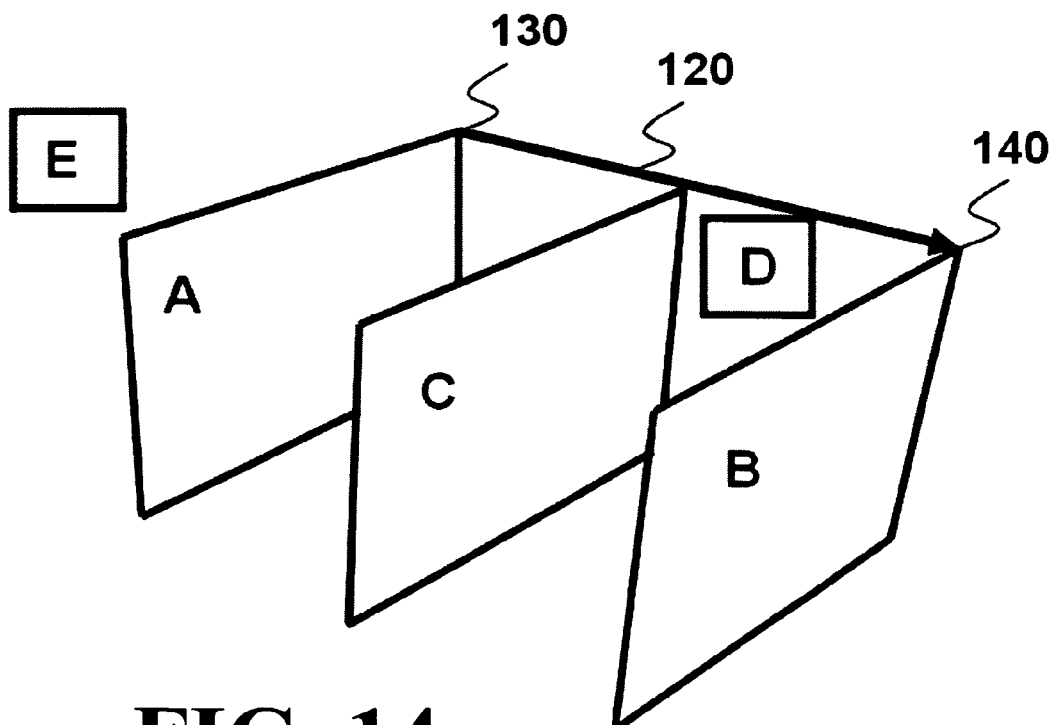
Figure 15:
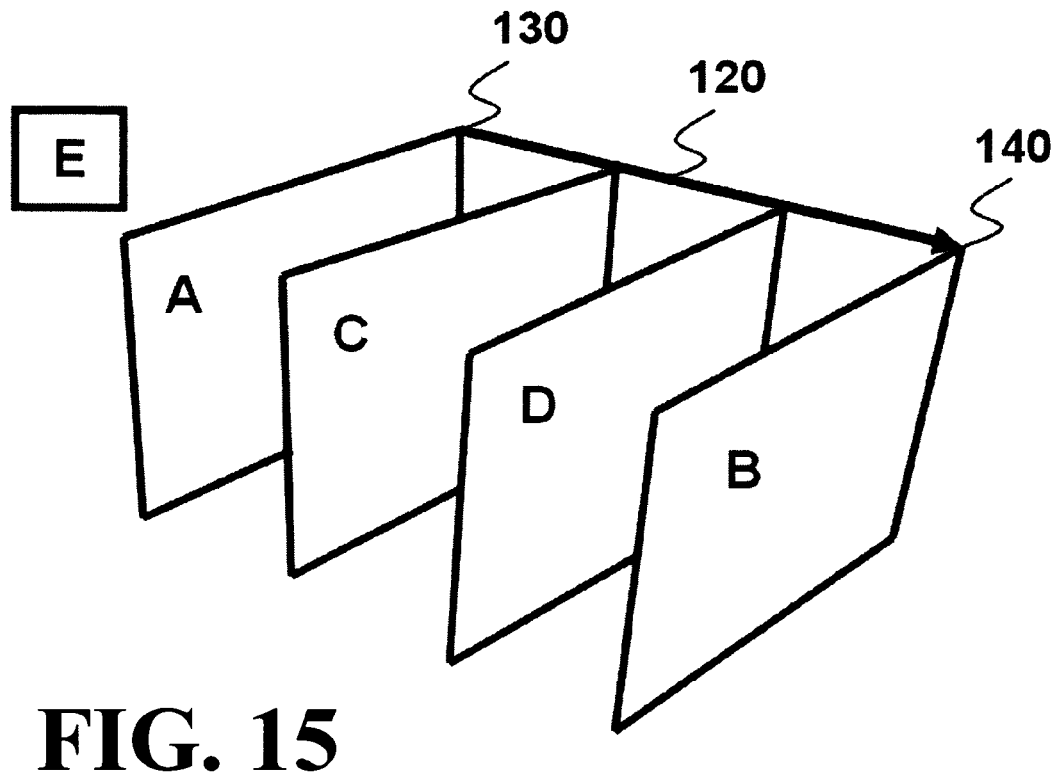
Figure 16:
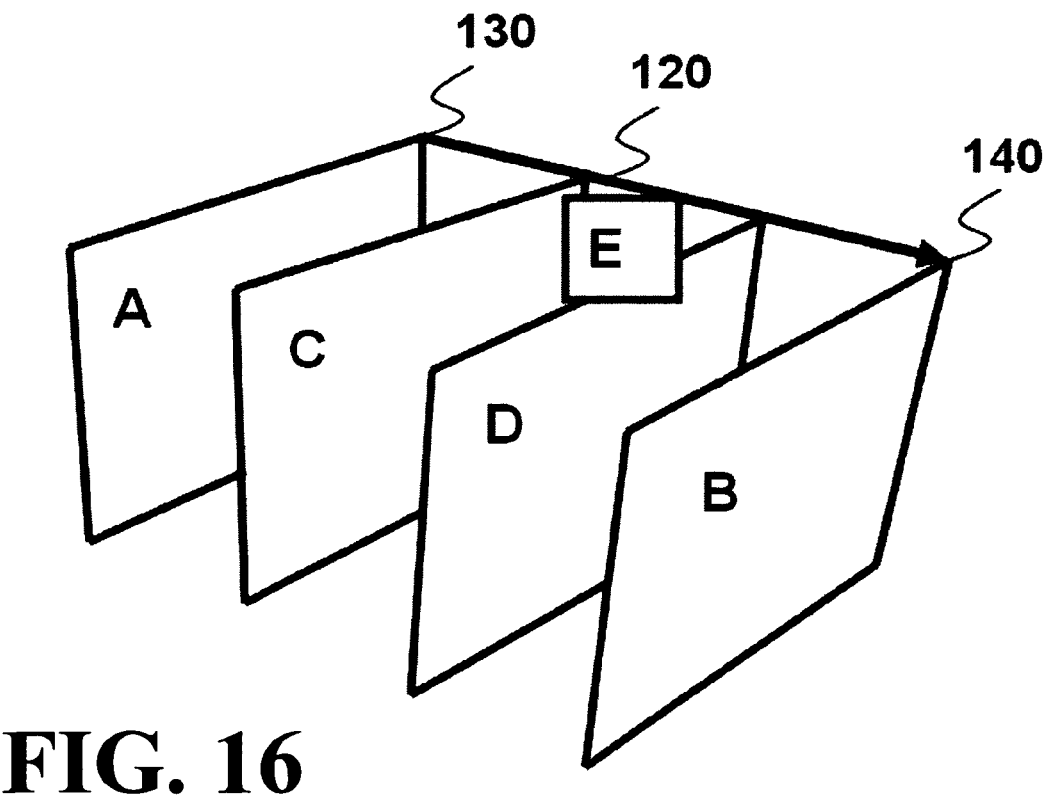
Figure 17:
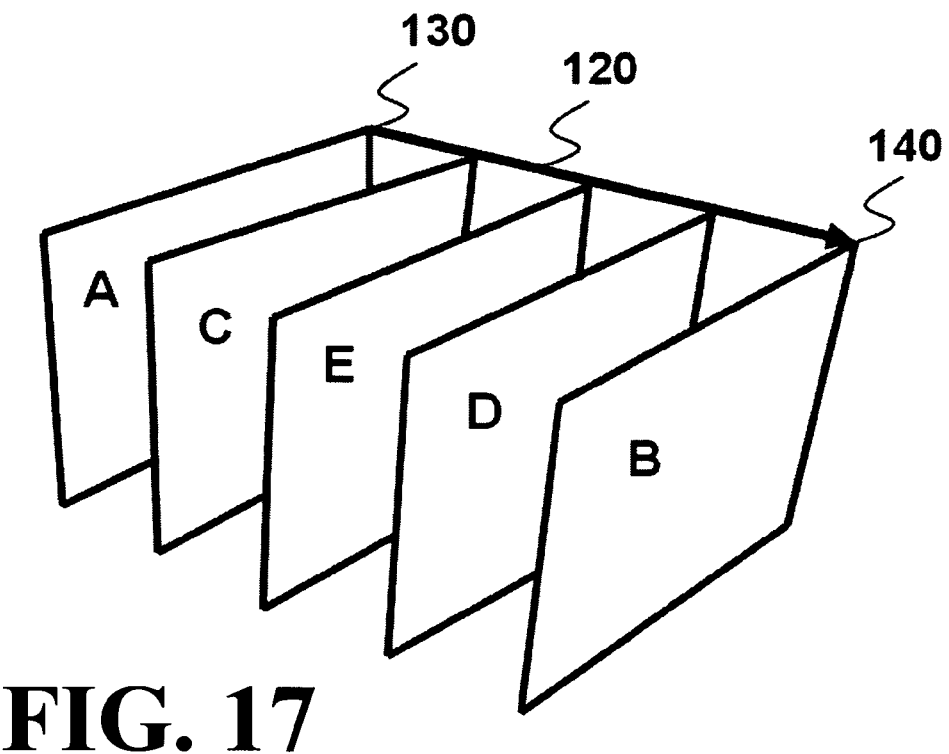

FIG. 14 illustrates dragging object D to be located on the 3D cursor between object B and object C. Once the user does so, then object D is rotated in 3D to be aligned to objects A, B, and C as illustrated in FIG. 15. As shown in the figure, objects A, C, D, and B are automatically positioned on the 3D cursor to be successively equally apart from each other. FIG. 16 illustrates dragging object E to be located on the 3D cursor between object C and object D. Once the user does so, then object E is rotated in 3D to be aligned to the other four objects as illustrated in FIG. 17. As shown in the figure, objects A, C, E, D and B are automatically positioned on the 3D cursor to be successively equally apart from each other.

Figure 18:
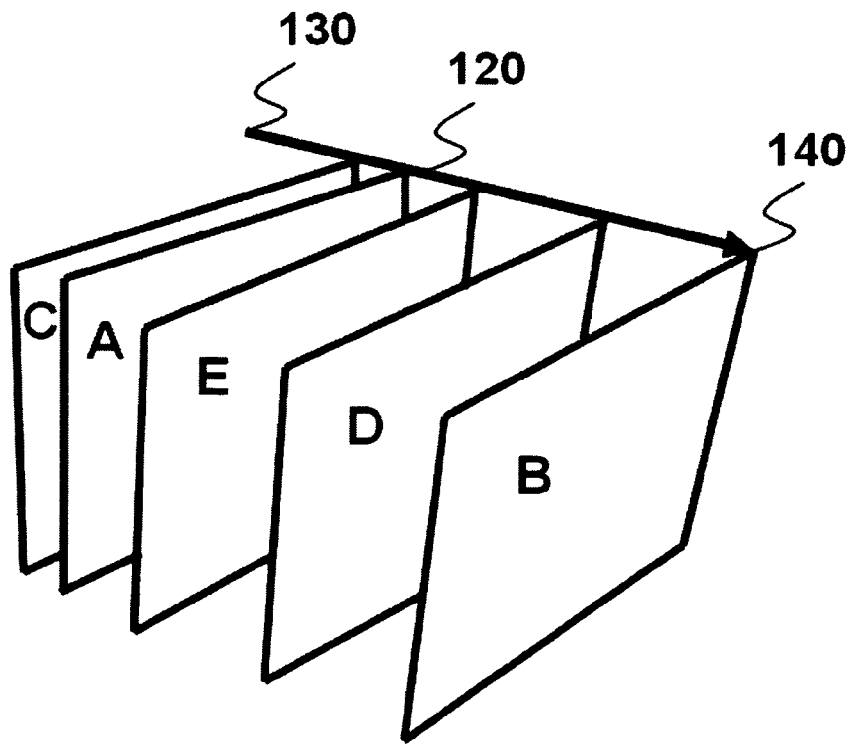
FIGS. 18 to 21 illustrate re-arranging the plurality of windows relative to each other in 3D on the computer display.
Figure 19:
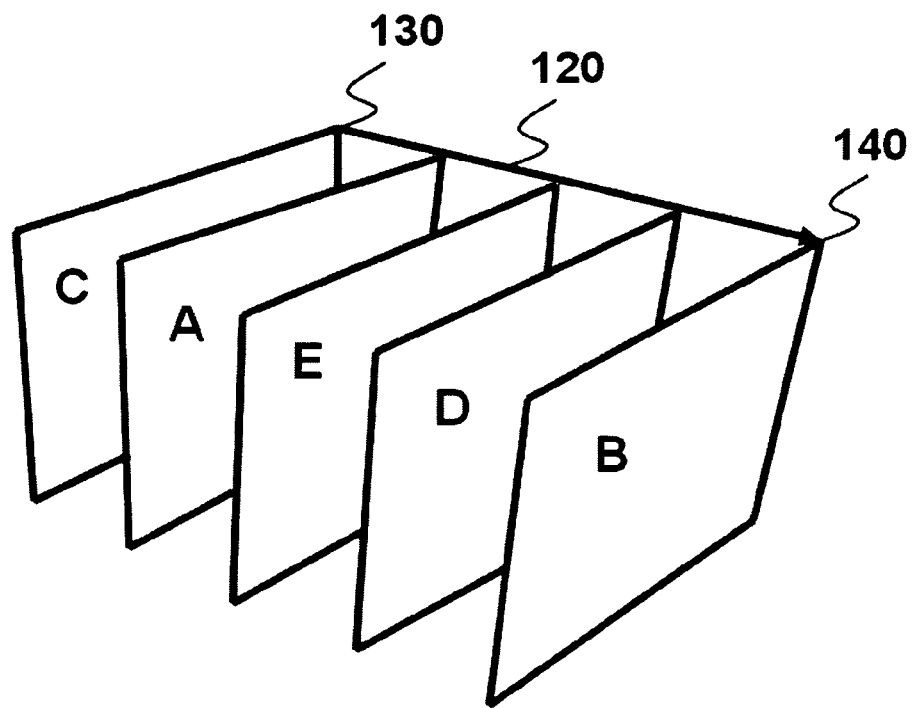
Figure 20:
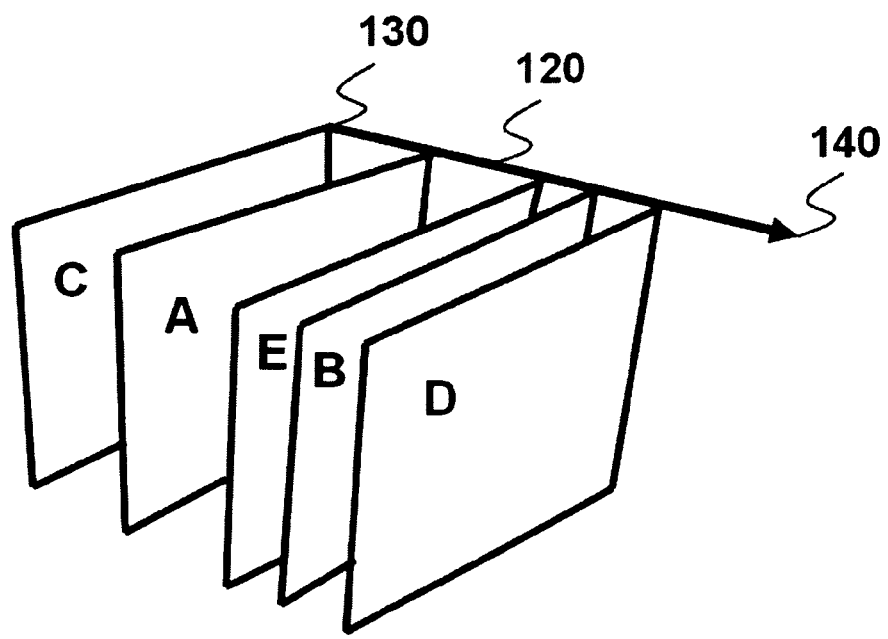
Figure 21:
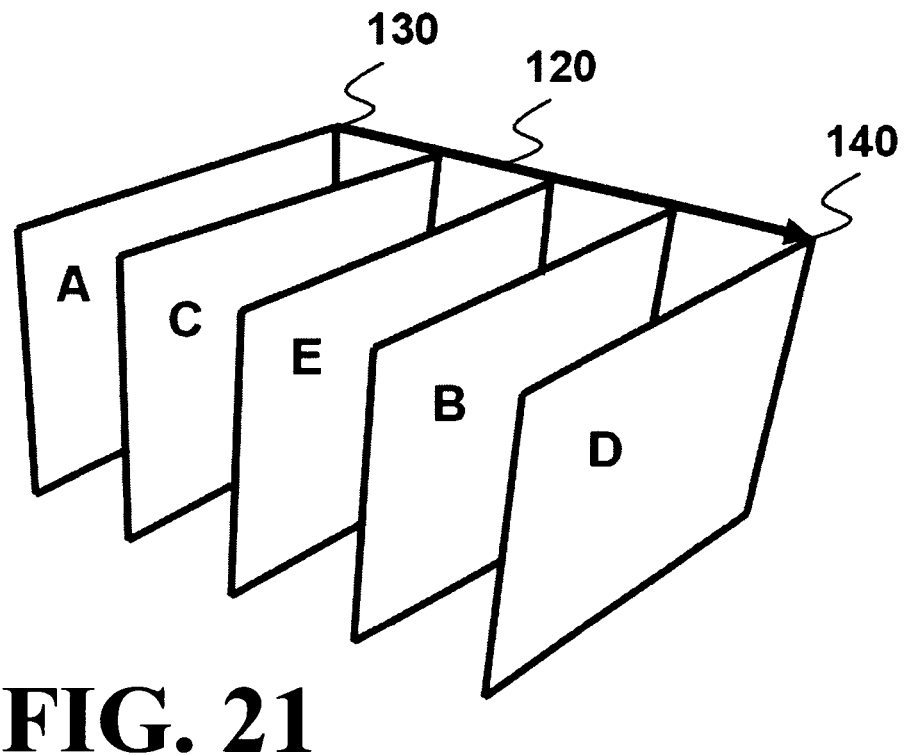

Generally, dragging an object such as an icon, image, or window on the computer display to be positioned on the 3D cursor that is located on a plurality of objects makes all the objects on the 3D cursor aligned to each other and automatically positioned to be successively equally apart from each other. In addition to, the dimensions or shapes of all the objects on the 3D cursor become similar to each other as illustrated on in the previous example. FIG. 18 illustrates dragging object A to be located between object C and object E on the 3D cursor, while FIG. 19 illustrates automatically repositioning the five objects on the 3D cursor to be successively equally apart from each other after dragging object A. FIG. 20 illustrates dragging object B to be located between object D and object E on the 3D cursor, while FIG. 21 illustrates automatically repositioning the five objects on the 3D cursor to be successively equally apart from each other after dragging object B. Generally, dragging an object of a plurality of objects that are located on the 3D cursor on the computer display makes the plurality of objects automatically repositioned on the 3D cursor to be successively equally apart from each other.

In one embodiment of the present invention, it is possible to make the plurality of objects continuously flipping along the 3D cursor on the computer display by pressing the "Alt" button of the computer keyboard while the 3D cursor is selected by the traditional computer cursor. Generally, aligning a plurality of objects such as icons, images, or windows to each other, then flipping these objects to be continuously moving on the 3D cursor, helps presenting a big number of objects on the computer display in a simple and organized manner.

Figure 22:
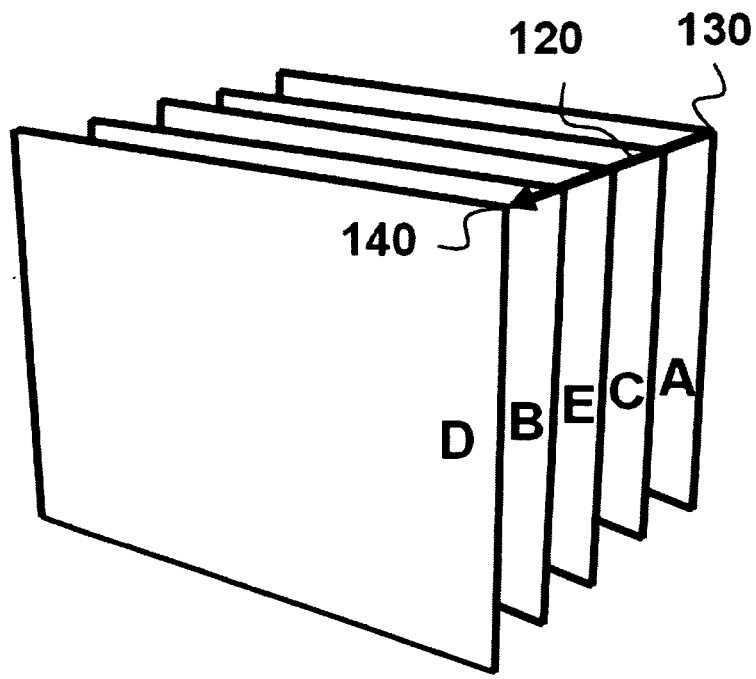
FIGS. 22 to 25 illustrate rotating, protracting, and retracting the 3D cursor in 3D on the computer display.
Figure 23:
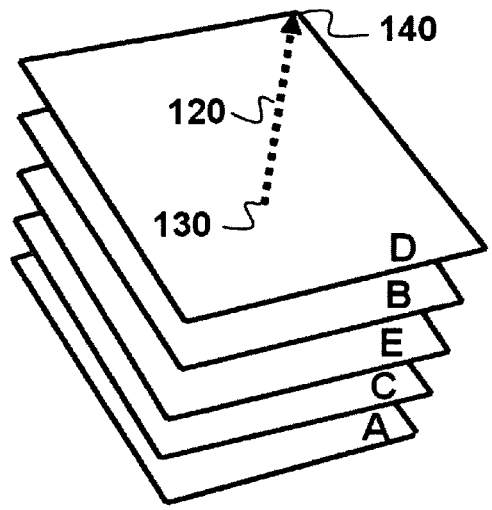
Figure 24:
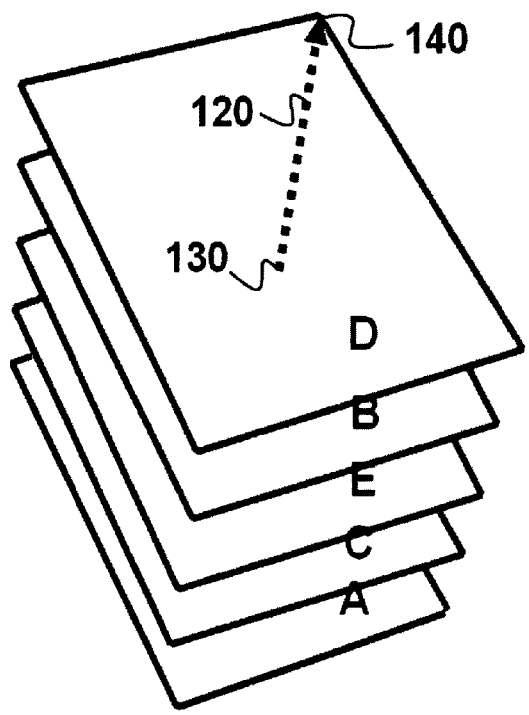
Figure 25:
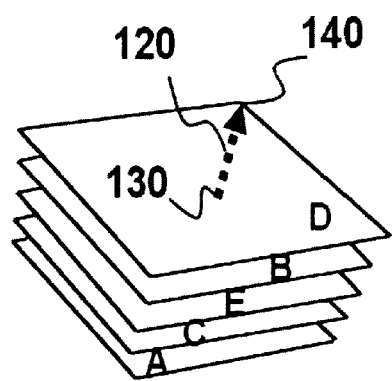

FIG. 22 illustrates rotating the 3D cursor of FIG. 21 horizontally to simultaneously rotate the five objects horizontally on the computer display. FIG. 23 illustrates rotating the 3D cursor of FIG. 22 vertically to simultaneously rotate the five objects vertically on the computer display. FIG. 24 illustrates protracting the 3D cursor of FIG. 23 to protract the equal distances between the five objects on the computer display. FIG. 25 illustrates retracting the 3D cursor of FIG. 24 to retract the equal distances between the five objects on the computer display. Generally rotating, protracting, or retracting the 3D cursor as described previously enables the user to simultaneously rotate a plurality of objects, or to simultaneously move the plurality of objects away from each other or closer to each other on the computer display. However, it is important to note that, the 3D cursor can be dragged or moved by the traditional computer cursor to simultaneously drag or move the objects that are located on the 3D cursor on the computer display.

Figure 26:
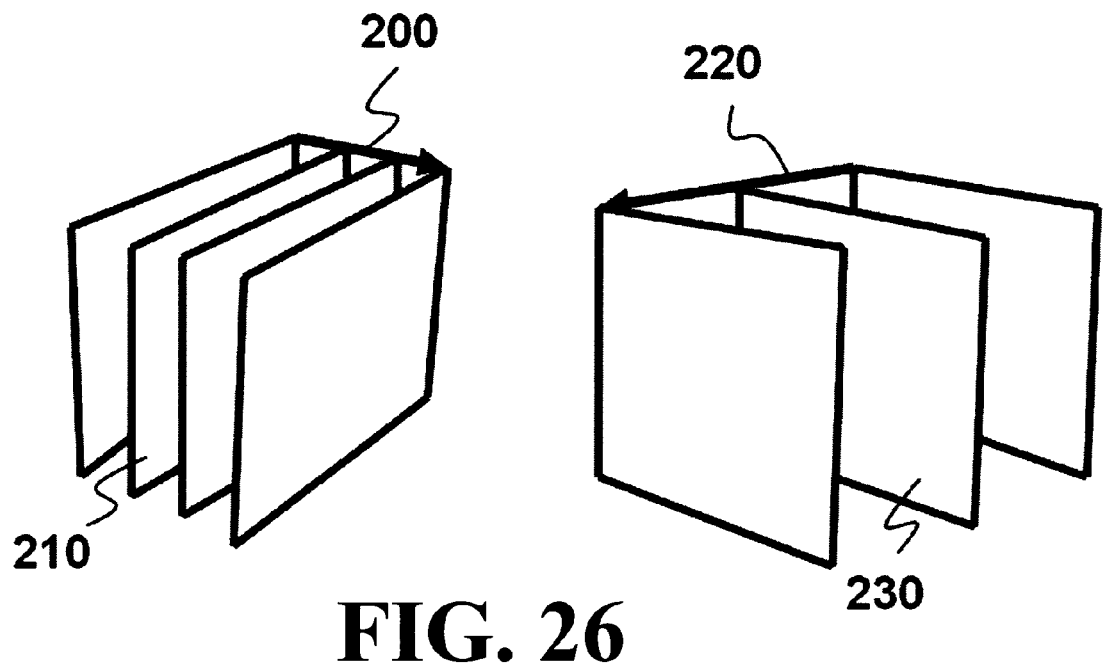
FIGS. 26 and 27 illustrate zooming out at a 3D cursor on the computer display.
Figure 27:
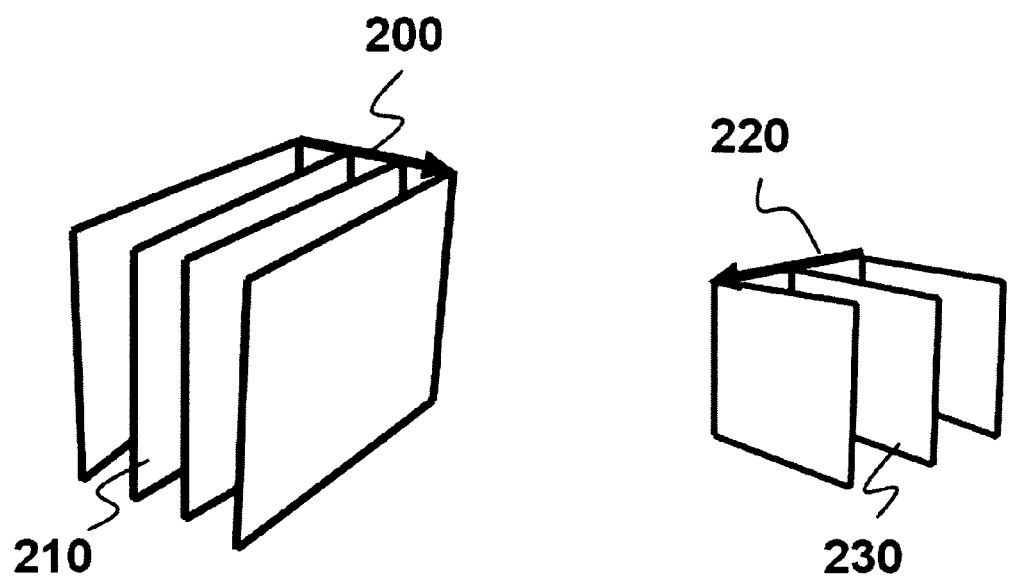

In one embodiment of the present invention, it is possible to "zoom in" or "zoom out" at the 3D cursor to increase or decrease the scale of the objects that are located on it on the computer display. This can be achieved by selecting the 3D cursor then rotating the "top scroll wheel" of the mouse "up" or "down" to, respectively, "zoom in" or "zoom out". In this case, the "zoom in" and the "zoom out" will be only applied on the selected 3D cursor and its objects while the other 3D cursors or the other objects on the computer display will remain the same without re-scaling. For example, FIG. 26 illustrates a first 3D cursor 200 located on a first group of objects 210, and a second 3D cursor 220 located on a second group of objects 230. FIG. 27 illustrates zooming out at the second 3D cursor and the second group of objects, where the first 3D cursor and the first group of objects remained the same on the computer display. This function enables the user to simply organize displaying multiple objects on the computer display according to his/her needs or preference.

Figure 28:
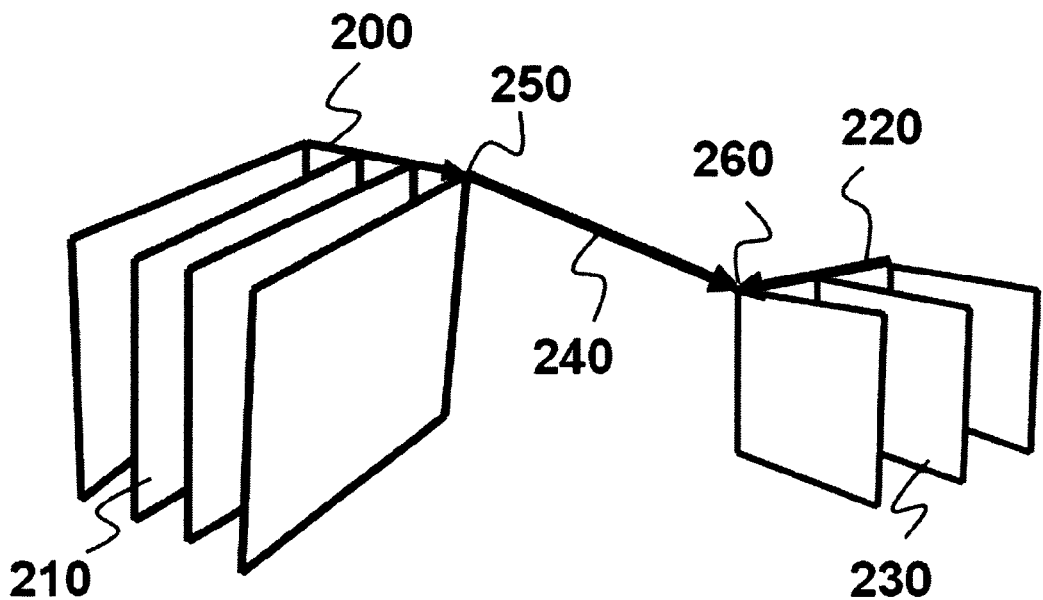
FIGS. 28 and 29 illustrate joining two groups of windows to each other in 3D on the computer display using the 3D cursor.
Figure 29:
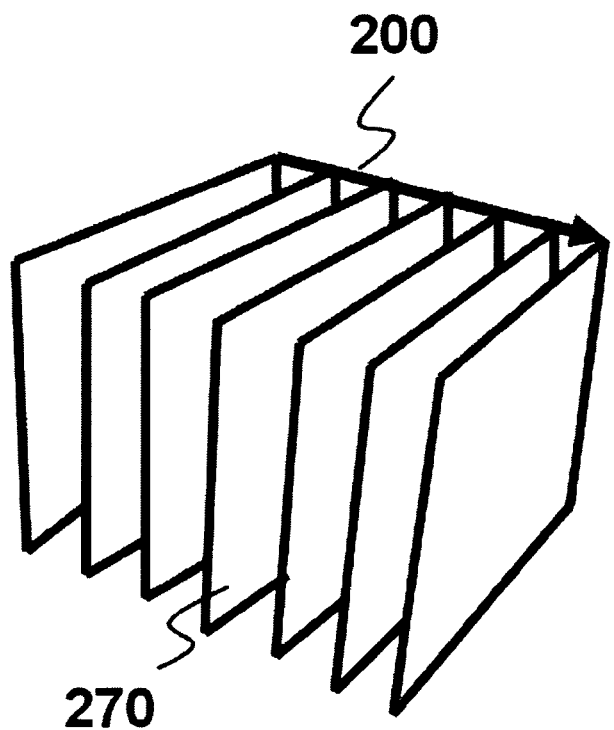
Figure 30:
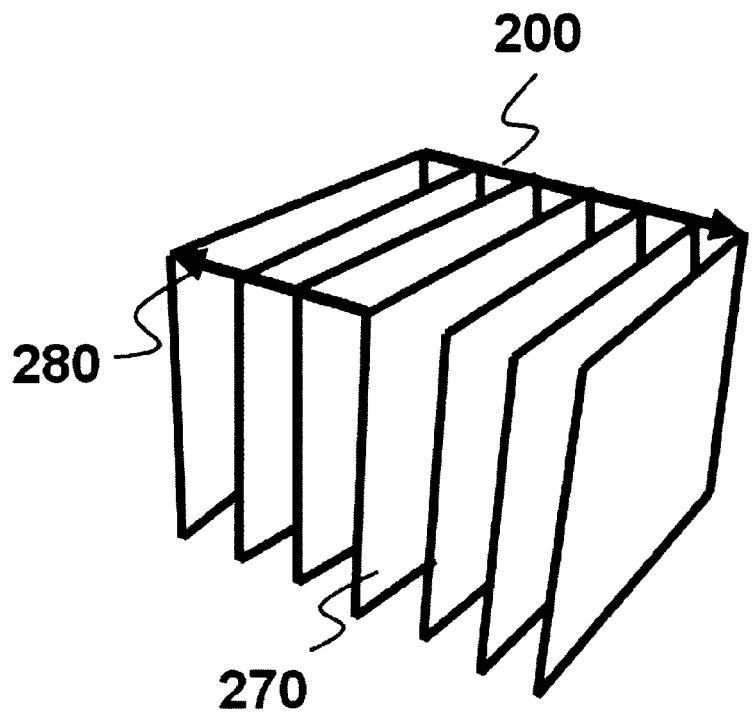
FIGS. 30 and 31 illustrate separating two groups of windows from each other in 3D on the computer display using the 3D cursor.
Figure 31:
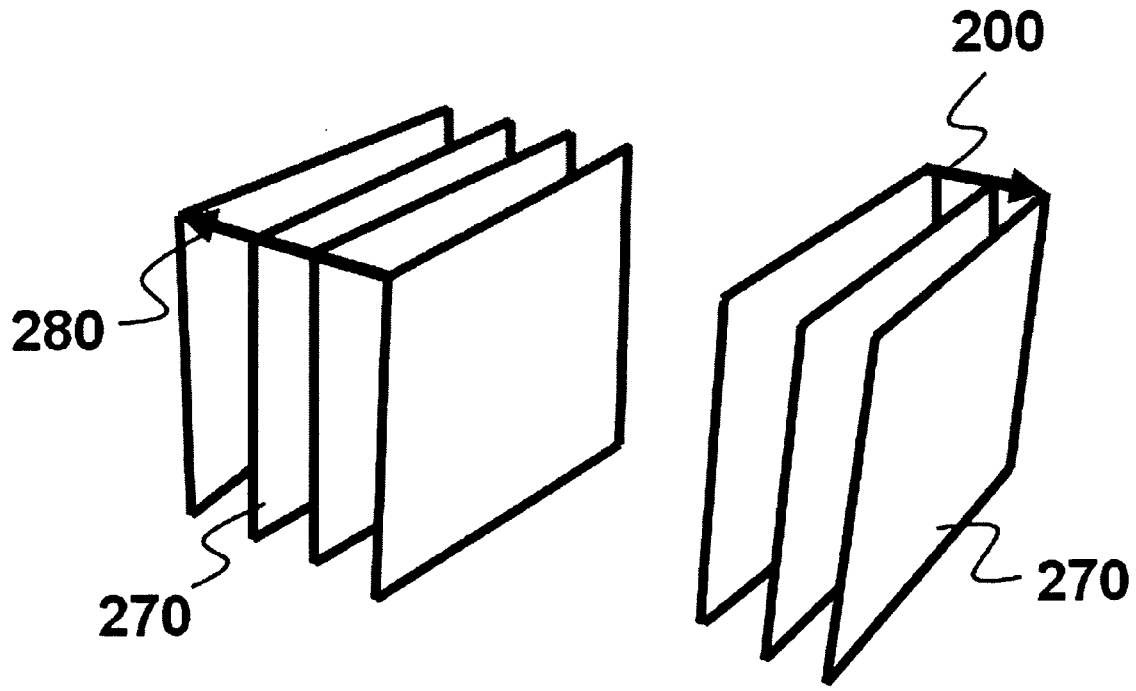

In another embodiment of the present invention, to join a second group of objects to a first group of objects the user creates a third 3D cursor connecting between the first 3D cursor of the first group of objects and the second 3D cursor of the second group of objects. For example, FIG. 28 illustrates creating a third 3D cursor 240 by locating its first end 250 on the first 3D cursor, and locating its second end 260 on the second 3D cursor of FIG. 27. Once the user does that the second group of objects are re-shaped and aligned to emulate and join the first group of objects forming one group of objects 270 as illustrated in FIG. 29. In one embodiment of the present invention, the user can also divide a group of objects into two groups of objects using the 3D cursor. For example, FIG. 30 illustrates creating an additional 3D cursor 280 on four objects of the seven objects of FIG. 29, then dragging this additional 3D cursor to separate said four objects from the seven objects as illustrated in FIG. 31. If the user needs to hide or delete a 3D cursor on the computer display the user selects this 3D cursor then presses the "Delete" button of the computer keyboard.

The previous examples illustrate moving the 3D cursor linearly; however, it is possible to move the 3D cursor in curves or circles according to one embodiment of the present invention. This can be done, for example, when using the computer keyboard, by pressing the arrow buttons of the computer keyboard while pressing the 'Control' button. For example, simultaneously pressing the "Right" arrow button and the "Control" button gradually bends the 3D cursor horizontally forming a curve then a complete circle as illustrated in FIGS. 32.1 to 32.7. Also simultaneously pressing the "Left" arrow button and the "Control" button gradually returns the 3D cursor to its original linear form. In case of pressing the "Up" or "Down" arrow buttons instead of the "Right" or "Left" arrow buttons the 3D cursor bends vertically instead of bending horizontally. Such horizontal or vertical bending of the 3D cursor enables presenting the icons, images, windows, or the like in an innovative curvature style on the computer display.

Figure 33:
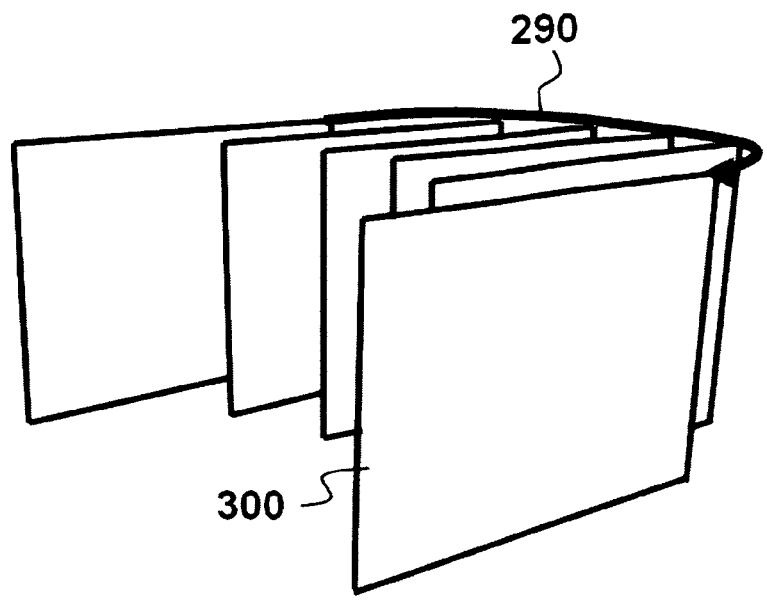
FIGS. 33 and 34 illustrate rotating the 3D cursor horizontally in a semi-circle path on the computer display.
Figure 34:
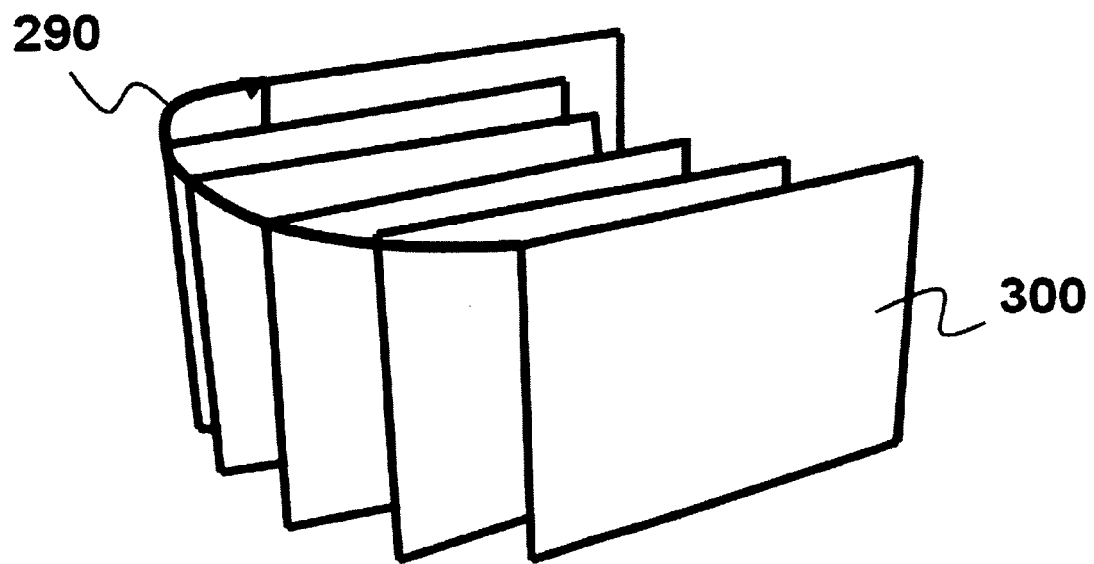
Figure 35:
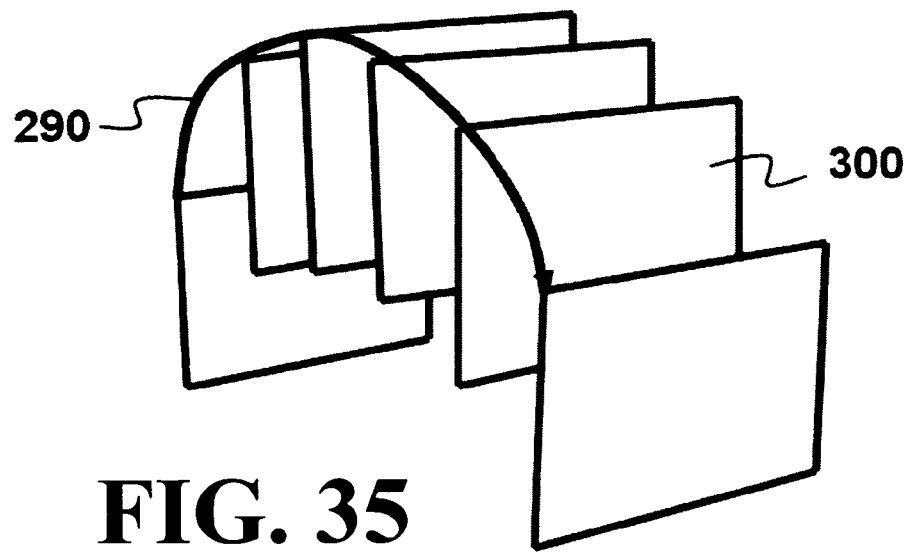
FIGS. 35 and 36 illustrate rotating the 3D cursor vertically in a semi-circle path on the computer display.
Figure 36:
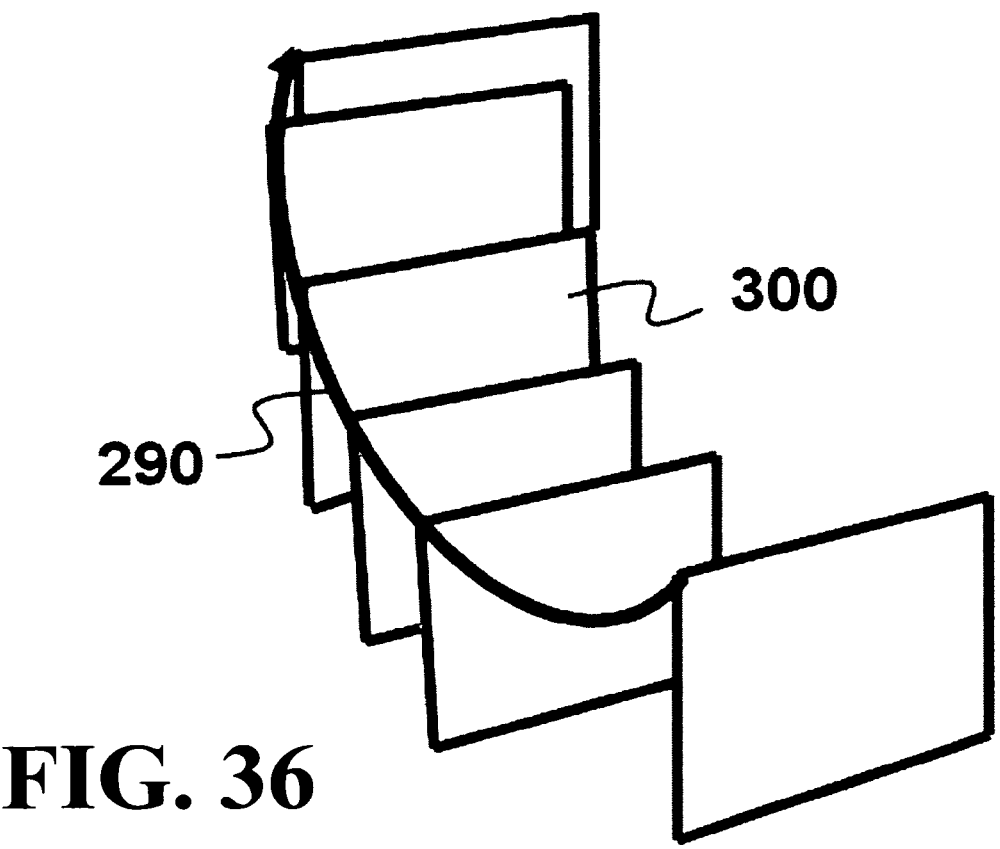

For example, FIG. 33 illustrates bending a 3D cursor 290 horizontally to position its objects 300 in a semi-circle fashion or arrangement. At this moment, pressing the "Alt" button of the computer keyboard continuously rotates the 3D cursor and its objects horizontally about the original mid-point of the 3D cursor. FIG. 34 illustrates an example for a position of the 3D cursor and its objects during this horizontal rotation. For example, FIG. 35 illustrates bending a 3D cursor 290 vertically to position its objects 300 in a semi-circle fashion or arrangement. At this moment, pressing the "Alt" button of the computer keyboard continuously rotates the 3D cursor and its objects vertically about the original mid-point of the 3D cursor. FIG. 36 illustrates an example for a position of the 3D cursor and its objects during this vertical rotation. To stop the rotation of the 3D cursor the user presses again on the "Alt" button of the computer keyboard.

Figure 37:
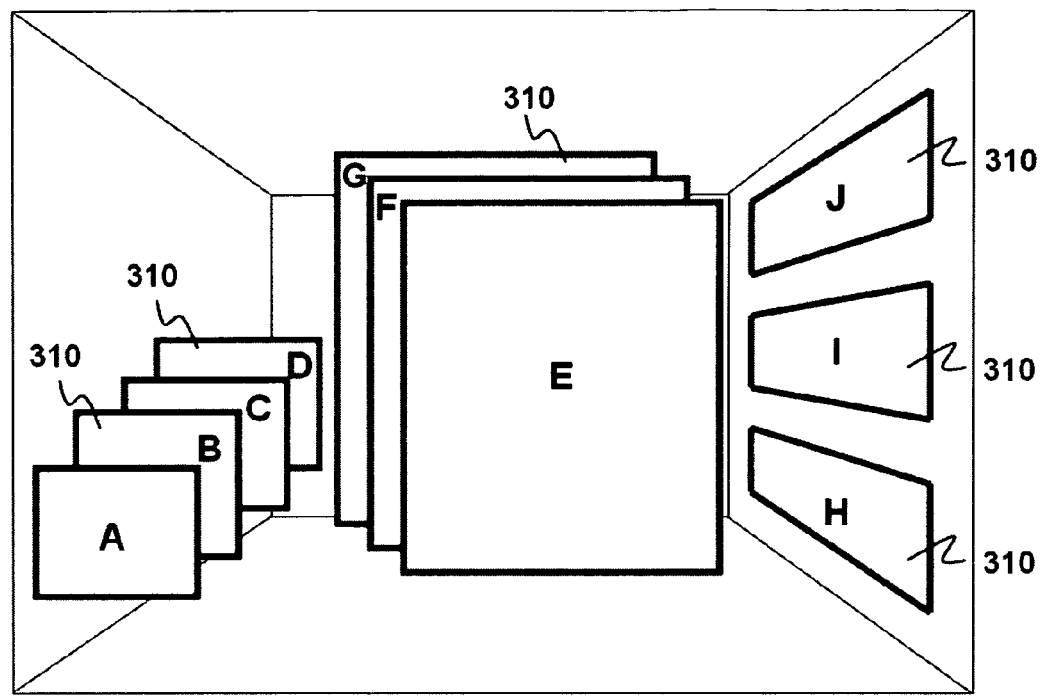
FIGS. 37 and 38 illustrate interacting with a website in 3D on the computer display using the 3D cursor.
Figure 38:
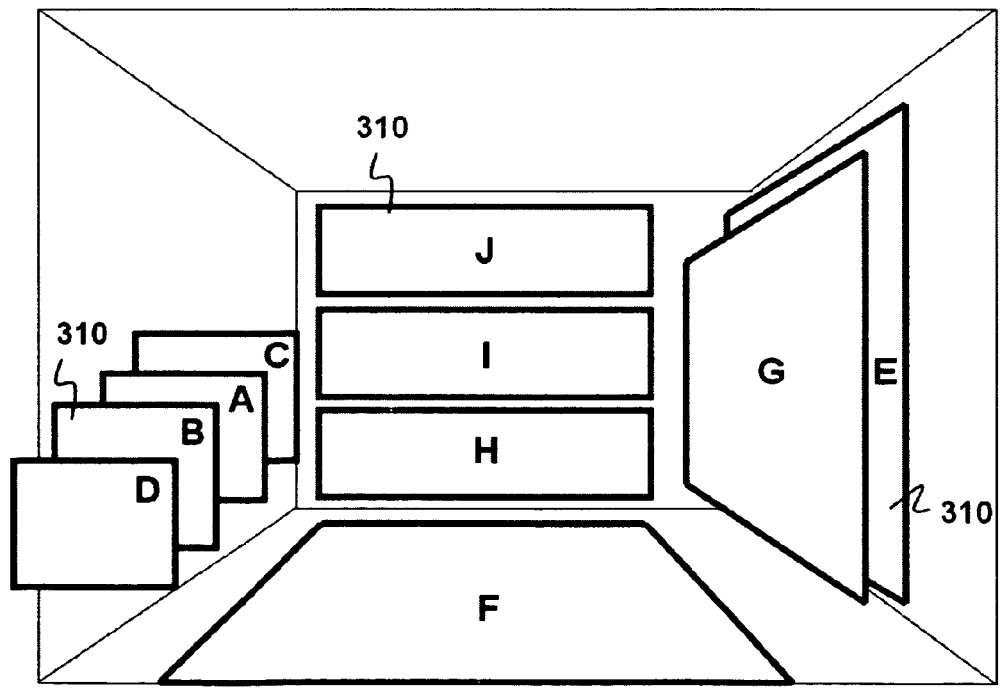

Overall the present invention of 3D computer cursor enables the user to interact with the 3D applications on the computer display in an intuitive manner serving a variety of desktop and web-based applications. In one embodiment of the present invention, FIG. 37 illustrates an innovative interaction of the 3D cursor with a 3D website that is comprised of a plurality of objects 310 representing different text, images, or windows symbolized by English letters A, B, C, D, E, F, G, H, I, and J. As illustrated in FIG. 38, using the present invention the user becomes able to re-arrange or flip objects A, B, C, and D relative to each other. Also the user becomes able to rotate objects E and G horizontally and rotate object F vertically. Moreover, the user simultaneously rotates and moves objects H, I, and J to be in the middle of the computer display. In other words, the user becomes able to re-shape the 3D website or its graphical user interface according to his/her needs or preference.

Figure 39:
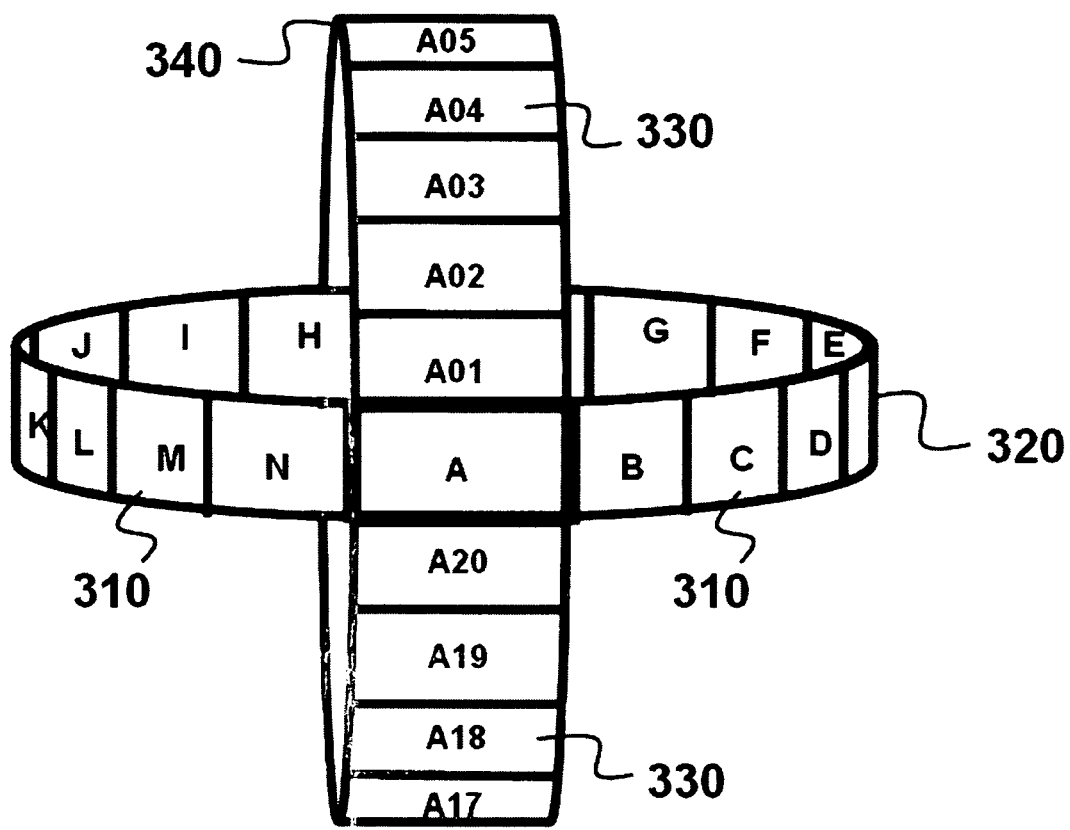
FIG. 39 illustrates a 3D menu formed by the 3D cursor to present a plurality of folders and files in 3D on the computer display.

FIG. 39 illustrates another innovative application for creating a 3D menu on the computer display using the present invention. In this example using the 3D cursor the user formed a plurality of folders 310 in a horizontal cylindrical form 320 where each folder includes a plurality of files 330 that can be presented in a vertical cylindrical form 340 on the computer display. As shown in the figure, the folders are symbolizes with English letter, and the files are symbolized with numerals. In this case the folder that is located in the middle of the computer display is opened to display its files, where rotating the folders horizontally on the computer display enables positioning different folder to be located in the middle of the computer display to open its files.

Overall, the present invention of 3D computer cursor can be used with a variety of desktop and web-based applications enabling the user to interact with the 3D computer applications in a simple and intuitive manner. However, the present invention enables the user to interact with a variety of objects such as icons, images, or windows on the computer display. Such objects are traditionally presented on the computer display in a two-dimensional mode, where each object is in a form of a rectangle that has four vertices, where each vertex has x and y coordinates relative to the dimension of the computer display. When the user rotates an object vertically the object is converted into the three-dimensional mode where each one of its vertices will have new x, y, and z coordinates. When the user rotates this object again horizontally/vertically the vertices coordinates of the objects are changed according to the direction and the angle of rotation.

To align a second object to a first object that is located on a 3D cursor on the computer display the vertices coordinates of the first object are adjusted to reshape the second object similarly to the first object, in addition to, making the second object parallel to the first object. When rotating an object that contains a text or an image on the computer display, in this case, the text or the image is automatically rotated inside the boundaries of the object to be in a readable position to the user on the computer display. When having a plurality of windows on a 3D cursor on the computer display where the user needs to turn one of these windows into a full screen mode then the user double clicks on this window to turn it to the full screen mode. Once the user needs to return the full screen window to its previous position on the 3D cursor the user double clicks again on the window while it is in the full-screen mode.

Each plurality of objects that are located on a 3D cursor is considered to be in a separate small window on the computer display. This window separation enables the user to "zoom in" or "zoom out" at each plurality of objects without affecting the other plurality of objects that are located on other 3D cursors on the computer display. It is important to note that the 2D objects and the 3D objects are located on two separate layers on the computer display. Accordingly when dragging a 2D object on the computer display it follows the 2D rules, once this 2D object is converted into a 3D object it moves from the 2D layer to the 3D layer. The same case when moving or rotating a 3D object it follows the 3D rules, once this 3D object is converted into a 2D object, it moves from the 3D layer to the 2D layer.

When rotating, protracting, or retracting the 3D cursor with a plurality of objects the virtual camera is adjusted to fit the plurality of objects on the computer display. In other words, in some cases, the virtual camera is moved further to enable projecting the 3D cursor and the plurality of objects on the computer display. This technique is important to ensure that the user will not lose a part of the view because of the movement or the rotation of the 3D cursor. Viewing the objects in 3D on the computer display can take different styles, for example, it can be one-point perspective, two-point perspective, or three-point perspective. The one-point perspective has one vanishing point, the two-point perspective has two vanishing points, and the three-point perspective has three vanishing points. The vanishing point, as know in the art, is the point in the perspective to which parallel lines appear to converge.

The movements of objects while converting them form a 2D mode to a 3D mode, or while starting moving or rotating them with the movement/rotation of the 3D cursor can look like a natural movement by applying the laws of dynamics on them. The light and shade or shadow effects can also be added to the objects on the computer display to give a natural feeling to their appearance. Generally, as described previously, the use of the present invention of the 3D computer cursor is simple and straightforward, where the computer user can utilize the traditional input devices to easily interact with various 3D computer applications.

In one embodiment of the present invention, the user becomes able to control the value of the rotation angle of the 3D cursor by presenting this value in numerals on the computer display while rotating the 3D cursor vertically or horizontally in three-dimensions. In another embodiment of the present invention, the user becomes able to control the value or dimension of protracting or retracting the 3D cursor by presenting this value in numerals on the computer display while protracting or retracting the 3D computer cursor. This feature is important to be utilized while interacting with computer applications that require more precision such as the 3D modeling applications or the 3D engineering applications.

The invention claimed is:

1. A human-computer interaction method to relocate a plurality of virtual windows from a two-dimensional space to a three-dimensional space wherein any two or more of the plurality of virtual windows are not located on one object nor connected in sequence to form or reconstruct a structure, and the method comprising;
   presenting the plurality of virtual windows on a two dimensional plane;
   providing a first input representing resizing and rotating a single virtual window of the plurality of virtual windows in three dimensions wherein the resizing and the rotating are applied only to the single virtual window;
   providing a second input representing creating a line to intersect with the single virtual window;
   providing a third input representing moving one or more of the plurality of virtual windows to intersect with the line and match the size and rotation of the single virtual window; and
   providing a fourth input representing re-arranging or relocating one of the virtual windows that intersect with the line to automatically rearrange or relocate the virtual windows that intersect with the line, relative to each other.

2. The human-computer interaction method of claim 1 wherein the virtual windows represent icons, menus, images or software applications.

3. The human-computer interaction method of claim 1 wherein the virtual windows represent websites or webpages.

4. The human-computer interaction method of claim 1 wherein the virtual windows are located equally apart from each other on the line.

5. The human-computer interaction method of claim 1 wherein the virtual windows can be rotated or moved in three dimensions with the line.

6. The human-computer interaction method of claim 1 wherein the line can be horizontally or vertically rotated in three dimensions on a display.

7. The human-computer interaction method of claim 1 wherein the line can be moved in three-dimensions on a display.

8. The human-computer interaction method of claim 1 wherein the line can be converted into a curve, semi-circle, circle or other shapes.

9. The human-computer interaction method of claim 1 wherein the plurality of virtual windows are presented on a display of a computer, tablet or mobile phone.

10. The human-computer interaction method of claim 1 wherein the plurality of virtual windows are presented on an optical head-mounted display in the form of eyeglasses.

11. The human-computer interaction method of claim 1 wherein the first input, the second input, the third input and the fourth input are provided by a computer input device such as a touchscreen, computer keyboard or computer mouse.

12. The human-computer interaction method of claim 1 wherein the first input, the second input, the third input and the fourth input are provided by vocal instructions.

13. The human-computer interaction method of claim 1 wherein each one of the virtual windows intersecting with the line can be turned into a full screen mode on a display.

14. The human-computer interaction method of claim 1 further the virtual windows intersecting with the line can be combined with another virtual windows intersecting with another line to form one group of virtual windows intersecting with a single line.

15. The human-computer interaction method of claim 1 wherein the virtual windows intersecting with the line can be divided into multiple groups of virtual windows each of which contains one or more virtual windows intersecting with a line.

16. The human-computer interaction method of claim 1 wherein the line and the virtual windows intersecting with the line can be simultaneously resized on a display.

* * * * *